United States Patent [19]

Auerbach et al.

[11] Patent Number: 4,843,115
[45] Date of Patent: Jun. 27, 1989

[54] POLYACETAL STABILIZER FORMULATION WITH IMPROVED COLOR STABILITY

[75] Inventors: Andrew B. Auerbach, Livingston; James L. Paul, Summit; K. M. Natarajan, New Brunswick, all of N.J.

[73] Assignee: Hoechst Celanese Corporation, Chatham, N.J.

[21] Appl. No.: 154,439

[22] Filed: Feb. 9, 1988

Related U.S. Application Data

[63] Continuation of Ser. No. 932,238, Nov. 18, 1986, abandoned.

[51] Int. Cl.$^4$ .................. C08K 5/34; C08L 51/00
[52] U.S. Cl. .................. 524/100; 524/538; 524/542
[58] Field of Search .................. 524/100, 538, 542

[56] References Cited

U.S. PATENT DOCUMENTS

| | | | |
|---|---|---|---|
| 2,993,025 | 7/1961 | Alsup et al. | 524/343 |
| 3,235,624 | 2/1966 | Green | 260/857 |
| 3,313,767 | 4/1967 | Berardinelli et al. | 524/108 |
| 3,314,918 | 4/1967 | Berardinelli et al. | 524/100 |
| 3,316,207 | 4/1967 | Hermann et al. | 260/45.8 |
| 3,444,265 | 5/1969 | O'Brien, Jr. et al. | 260/857 |
| 3,448,081 | 6/1969 | Hafner et al. | 260/67 |
| 3,480,694 | 11/1969 | Moncure, Jr. | 260/857 |
| 3,524,832 | 8/1970 | Green | 260/45.9 |
| 4,098,843 | 7/1978 | Johnson | 525/183 |
| 4,342,680 | 8/1982 | Sugio et al. | 524/100 |
| 4,386,178 | 5/1983 | Schuette et al. | 524/100 |
| 4,506,053 | 3/1985 | Sakurai et al. | 524/405 |

Primary Examiner—Kriellion Morgan
Attorney, Agent, or Firm—Depaoli & O'Brien

[57] ABSTRACT

An oxymethylene polymer composition which exhibits a reduced tendency to form mold deposits upon molding, reduced tendency to discolor under thermal stress and low extractable formaldehyde levels is provided by utilizing as a stabilizer a major amount of superpolyamide and a minor amount of a cyclic amidine compound of the formula:

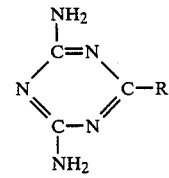

wherein R is phenyl, polynuclear aromatic, heterocyclic, cycloaliphatic and aliphatic containing at least 6 carbon atoms, as well as substituted derivatives of the listed substituents.

7 Claims, No Drawings

POLYACETAL STABILIZER FORMULATION WITH IMPROVED COLOR STABILITY

This application is a continuation, of applicaiton Ser. No. 932,238 filed, Nov. 18, 1986 now abandoned.

FIELD OF THE INVENTION

The present invention relates to stabilized oxymethylene polymers. More particularly, it relates to stabilized oxymethylene polymers which exhibit a low tendency to form mold deposits upon molding and a reduced tendency to discolor under thermal stress.

BACKGROUND OF THE INVENTION

The term oxymethylene polymer as used herein is meant to include oxymethylene homopolymers and diethers and diesters. Also included are oxymethylene copolymers, which include oxymethylene polymers having at least 60 percent recurring oxymethylene units and at least one other unit derived from a monomer copolymerizable with the source of the oxymethylene units.

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

While the high molecular weight oxymethylene polymers are relatively thermally stable, various treatments have been proposed to increase the polymers utility by increasing thermal stability. Among these are end capping of hemiformal groups of polyoxymethylene homopolymers and hydrolysis to remove unstable groups of oxymethylene in copolymers containing interspersed stable units, such as ethoxy groups. Even beyond these treatments, it has been found necessary to incorporate various stabilizers, antioxidants and chain-scission inhibitors into the polymers.

Unfortunately, oxymethylene polymers are subject to degradation, particularly under the influence of heat. The degradation results mainly from the following three processes:

1. Thermal degradation of the chain end with liberation of gaseous formaldehyde. This degradation which takes place largely under the influence of heat, is often obviated by the presence of either an ether or an ester group at the end of the polymer chain.

2. Oxidative attack leading to chain scission and depolymerization. This is often retarded by the addition of antioxidants to the composition such as compounds containing phenolic or amino groups.

3. Acidolytic cleavage of the chain may occur which also liberates formaldehyde. Acidolytic degradation arises from the presence of acidic species originating from one of several sources: (A) acidic catalyst residues which may have been used in preparation of the polymer, (B) formic acid formed in situ when the trace quantities of formaldehyde generated in processing are oxidized, and (C) acetic acid generated from acetate end groups when a given chain, so stabilized, depolymerizes as a result of occasional oxidative or acidolytic chain scission. To alleviate this condition and to prevent degradation of the polyoxymethylene copolymer especially during subsequent processing in the hot state, "formaldehyde acceptors" or "acid scavengers" are often admixed with the polymer composition. Among the compounds which can be used for this purpose are hydrazines and their derivatives, ureas, certain amides and diamides, polyamides, and metallic salts of acetic acid and fatty acids.

Among the most successful and widely used thermal stabilizers are nitrogen containing compounds which function as formaldehyde acceptors and acid scavengers. These have been found to be effective in lowering the thermal degradation rate of the polymer.

Among the preferred nitrogen compounds used to thermally stabilize oxymethylene polymers are amidine compounds, i.e., compounds having a carbon atom doubly bonded to one nitrogen atom and singly bonded to another. An especially preferred class of amidine compounds are the N-substituted amidine compounds wherein another nitrogen atom is singly bonded to the amidino group, most preferably at the carbon atom.

Suitable amidine compounds include the cyanoguanidine compounds including cyanoguanidine, itself, and other compounds including those containing the divalent 1-cyano-3,3 guanidino radical:

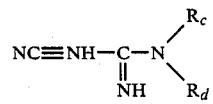

Among the substituted cyanoguanidines which may be used are those having one or two suitable inert substituents at the 3-nitrogen position of the guanidine nucleus. For example, in the above formula, $R_c$ and $R_d$ may be the same or different inert substituents including hydrogen, alkyl, aryl, cycloalkyl, hydroxylalkyl, haloalkyl, haloaryl and other substituents. Specific compounds which are suitable include 1-cyano-3 methyl guanidine, 1-cyano-3 ethyl guanidine, 1-cyano-3 isopropyl guanidine, 1-cyano-3,3-diphenyl guanidine, 1-cyano-3-hydroxymethyl guanidine, 1-cyano-3-dodecyl guanidine, 1-cyano-3-(2-hydroxyethyl) guanidine, 1-cyano-3-(2-bromoethyl) guanidine 1-cyano-3-(m-chlorophenyl) guanidine and 1,3-dicyanoguanidine.

Another useful stabilizer system disclosed in the prior art contains a cyclic amidine compound, e.g., having a ring carbon doubly bonded to one ring nitrogen atom and singly bonded to another ring nitrogen atom. Preferably the cyclic amidine compounds are devoid of carbon-to-carbon ethylenic unsaturation.

The preferred compounds of this class are amine-substituted derivatives of symmetrical triazines, including guanamines (2,4-diamino sym. triazines), melamine (2,4,6-triamino sym. triazine) and substituted melamines. The amino groups may be primary, secondary or tertiary and other substituents such as hydroxyl substituents may be present. Of course, the amino groups and other substituents must be those which are inert, i.e., will not induce undesirable reactions. Among the specific compounds which are suitable are 2,4-diamino-6-phenyl sym. triazine (benzoguanamine); 2,4-diamino-6-methyl sym. triazine; 2,4-diamino-6-butyl sym. triazine; 2,4-diamino-6-benzyloxy sym. triazine; 2,4-diamino-6-butoxy sym. triazine; 2,4-diamino-6-cyclohexyloxy sym. triazine; 2,4-diamino-6-chloro sym.

triazine; 2,4-diamino-6-mercapto sym. triazine; 2,4-dihydroxy-6-amino sym. triazine (ammelide); 2-hydroxy 4,6-diamino sym. triazine (ammeline); N,N,N',N'-tetracyanoethyl benzoguanamine; 2,4,6-triamino sym. triazine (melamine); phenyl melamine; butyl melamine; N,N-diethyl melamine; N,N-di-(2-hydroxyethyl melamine; N,N-diphenyl melamine; N,N-diallyl melamine; N,N',N''-trimethyl melamine; N,N',N''-triethyl melamine; N,N',N''-tri(n-propyl) melamine; N,N',N''-tri(n-butyl) melamine; N,N,N',N''-tetramethyl melamine; trimethylol melamine; trimethoxymethyl melamine; hexamethoxymethyl melamine; N,N',N''-triphenyl melamine; and N,N',N''-trimethylol melamine.

Still another preferred stabilizer is a compound containing both amine and amide groups and having from 0.2 to 5 amide groups per amino nitrogen atom ("amine-amides"). Preferred amine-amides are compounds wherein the amine groups are tertiary amine groups and wherein there are from one to three amide groups per amino nitrogen atom. Suitable amine-amides include compounds containing the structure $N-R_a-Z-R_b$ wherein $R_a$ is a divalent organic radical having terminal carbon bonds, Z is a

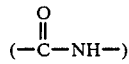

group which may be in any position with respect to the other atoms of the molecule, and $R_b$ is hydrogen or a monovalent organic radical having a terminal carbon bond, e.g., an alkyl or aryl group either unsubstituted or containing only inert substituents. The preferred compounds are compounds in which $R_b$ is hydrogen and the free nitrogen bonds are singly linked to carbon atoms; such compounds have terminal amide groups, i.e.,

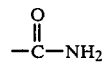

groups and tertiary amino groups. The free nitrogen bonds at the left of the formula in the preferred compounds may be linked to alkyl groups, aryl groups or may be linked through carbon atoms to the other atoms of a heterocyclic ring. The free nitrogen bonds may be linked to additional radicals having amide groups. If desired, the radical linked to the free nitrogen bonds may have one or more additional tertiary amino nitrogen atoms in their skeletons or may even comprise a repeating polymeric structure.

The divalent radical $R_a$ may be an alkylene radical, such as a methylene, ethylene or butylene radical, or an arylene radical, such as a phenylene radical. These radicals may be unsubstituted or may contain substituents which are inert. The divalent radicals may also, if desired, have one or more additional tertiary nitrogen atoms in their skeletons.

Among the specific tertiary amine-amides disclosed to be suitable are nitrilo-tris-beta propionamide; beta (4-morpholinyl) propionamide; N,N-diemthyl-p-carbamyl aniline; 4-diethylamino-2-methyl acetanilide and p-diethylamino acetanilide.

While the above defined stabilizers have been found useful in improving the thermal stablization of oxymethylene polymers, used alone, these stabilizers present problems which make these stabilizers somewhat undesirable for commercial applications. Foremost is the inability of these mentioned stabilizers to reduce formaldehyde levels in the polymer. Thus, while the N-containing stabilizers are weak bases which function to neutralize acids and thus reduce acidolytic cleavage of the oxymethyl polymer chain and readily react with formaldehyde to function initially as formaldehyde acceptors, the compounds do not hold onto the formaldehyde as the reverse reaction to release formaldehyde is as strong as the reaction to accept formaldehyde. Consequently, the level of free formaldehyde present in the molded components reduces the commercial applicability of these stabilizers for obvious environmental reasons.

A particularly preferred stabilizer and one that has found use in commercial applications is characterized as a superpolyamide. The superpolyamide stabilizers are the macromolecular superpolyamides, commonly known as nylons, that have carboxamide linkages

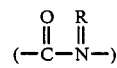

as integral portions of their polymer chains. These superpolyamides preferably have melting points below approximately 220° C., in which R represents a hydrogen atom, a lower alkyl group, or a lower alkoxy group, and have a degree of polymerization of approximately 100 to 200. A preferred group of the superpolyamides includes those condensation polymers that on hydrolysis yield either omega-aminocarboxylic acids or mixtures of dicarboxylic acids and diamines.

The superpolyamide stabilizers are most useful because, although less active as a formaldehyde acceptor than certain of the triazines, the superpolyamides hold onto the formaldehyde as the reverse reaction to release formaldehyde is slow. Consequently, oxymethylene compositions employing a superpolyamide stabilizer contain lower levels of extractable formaldehyde than compositions employing the other mentioned N-containing stabilizers. However, there still exists the need for improvement. Oxymethylene polymer compositions employing a superpolyamide stabilizer have a tendency to discolor under thermal stress. Recently it has been found that such superpolyamide polymers form mold deposits upon molding under high shear conditions. The present invention provides improvements to oxymethylene polymer compositions employing superpolyamide stabilizers.

SUMMARY OF THE INVENTION

The present invention provides stabilized oxymethylene polymer compositions which exhibit a reduced tendency to form mold deposits upon molding, reduced tendency to discolor under thermal stress and maintain the low level of free formaldehyde characteristic of superpolyamide-stabilized oxymethylene polymers. The compositions comprise an oxymethylene polymer selected from the group consisting of an oxymethylene homopolymer and copolymers thereof represented by the formula:

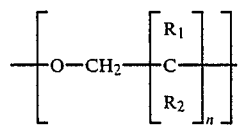

wherein R₁ and R₂ are each selected from the group consisting of hydrogen, lower alkyl and halogen-substituted lower alkyl radicals, n is an integer of from zero to 5 and wherein n is zero in from 60 to 99.6% of the recurring units, having incorporated therein a superpolyamide stabilizer and a cyclic amidine costabilizer comprising a compound of the following formula I:

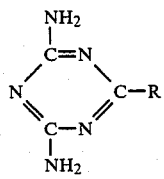
(I)

wherein R is phenyl, polynuclear aromatic, heterocyclic, cycloaliphatic, and long chain aliphatic, i.e., at least 6 carbon atoms as well as substituted derivatives of the listed groups.

Surprisingly, it has been found that even at low levels of triazine costabilizer, such as benzoguanamine, relative to the superpolyamide, the stabilized oxymethylene polymer exhibits greatly reduced coloration under thermal stress. Moreover, it is quite unexpected that the addition of small levels of cyclic amidine costabilizer would improve coloration, maintain the low levels of extractable formaldehyde and maintain as well the low levels of mold deposit characteristic of oxymethylene polymer compositions stabilized with superpolyamides. Addition of the costabilizer may allow for a reduction in the superpolyamide component and, thus provide improvements in coloration and mold deposit in superpolyamide stabilized oxymethylene polymer compositions.

DESCRIPTION OF THE PREFERRED EMBODIMENTS

The oxymethylene polymer used in the compositions of the present invention is well known in the art. The polymers are characterized as having recurring oxymethylene groups or units, i.e., —CH₂O—. The term oxymethylene polymer as used herein is intended to include any oxymethylene polymer having —CH₂O— groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Ser. No. 691,143, filed Oct. 21, 1957, now abandoned, by Hudgin and Berardinelli.

The homopolymers are usually stabilized against thermal degradation by end-capping.

Oxymethylene polymers that are particularly adapted for use in the compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the compositions of the present invention usually possess a relatively high level of polymer crystallinity, i.e., about 70 to 80 percent. These preferred oxymethylene copolymers have repeating units which consist essentially of (a) —OCH₂ groups interspersed with (b) groups represented by the general formula:

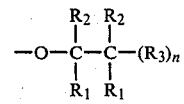

wherein each R₁ and R₂ is selected from the group consisting of hydrogen, lower alkyl and halogen-substituted lower alkyl radicals, each R₃ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH₂— units of (a) constitute from about 60 to about 99.6 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.4 to about 40 mole percent of a cyclic ether having at least two adjacent carbon atoms, preferably in the presence of a catalyst such as a Lewis acid (e.g, BF₃, PF₅, and the like) or other acids (e.g., HClO₄, 1% H₂SO₄, and the like).

In general, the cyclic ethers employed in making the preferred oxymethylene copolymers are those represented by the general formula:

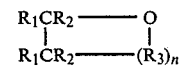

wherein each R₁ and R₂ is selected from the group consisting of hydrogen, lower alkyl and halogen-substituted lower alkyl radicals, and each R₃ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

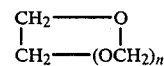

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers that are preferably present in the compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the compositions of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by either solution hydrolysis (hereinafter "SH") or melt hydrolysis (hereinafter "MH") to remove unstable groups. These processes degrade the hemiacetal end groups in the copolymer chain. Both processes are known to those skilled in the art and are in commerical practice. A useful solution hydrolysis process is disclosed in U.S. Pat. No. 3,179,948 and a useful melt hydrolysis process is disclosed in U.S. Pat. No. 3,318,848. If desired, the oxymethylene copolymer may be endcapped by techniques known to those skilled in the art. A preferred end-capping technique is accomplished by acetylation with acetic anhydride in the presence of sodium acetate catalyst.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

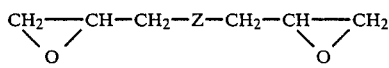

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1, 4-diol and 2-dimethyl-4-dimethylcyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer.

The trioxane-based terpolymer polymerization is advantageously carried out at temperatures at which trioxane does not crystallize out, that is, at a temperature within the range of $-50°$ C. to $+100°$ C., depending on the solvent used, and in the absence of a solvent at a temperature within the range of $+20°$ C. to $+100°$ C.

As trioxane-based terpolymer polymerization catalyst, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolymer in the same manner as known for other oxymethylene polymers. Advantageously, the terpolymer is suspended in aqueous ammonia at temperature within the range of 100° to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

It is also possible to thermally stabilize the terminal groups of the terpolymers in the absence of a solvent in the melt in the presence of a stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° to 250° C. for a specified period of time, and then washed with water and dried or centrifuged.

The oxymethylene polymers useful in this invention are primarily stabilized against thermal degradation by superpolyamides. The superpolyamides that may be present in the stabilized systems of this invention are those already known in the art and previously described. Typically, the superpolyamides are formed by the condensation of dicarboxylic acids with diamines or by the polymerization of α-amino-monocarboxylic acids. These superpolyamides have a degree of polymerization in the range of about 100 to 200, and they preferably have melting points below about 220° C. Among the useful superpolyamides are the condensation products of the following diamines and dicarboxylic acids: pentamethylenediamine/malonic acid; pentamethylenediamine/pimelic acid; hexamethylenediamine/adipic acid; hexamethylenediamine/sebacic acid; N,N'-hydroxymethylhexamethylenediamine/adipic acid; N,N'-methoxymethylhexamethylenediamine/adipic acid; octamethylenediamine/suberic acid; 1,1,6,6-tetramethylhexamethylenediamine/sebacic acid; decamethylenediamine/2,2,5,5-tetramethyladipic acid; and 2,5-dimethylpiperazine/glutaric acid. Also useful are the superpolyamides that are the self-condensation polymers derived, for example, from 6-aminocaproic acid, 9-aminononanoic acid, 11-aminoundecanoic acid or their lactams. Superpolyamides that are copolymers or terpolymers are also used. A particular preferred superpolyamide which has been used as a commercial stabilizer comprises a terpolymer of approximately 38% polycaprolactam/35% polyhexamethylene adipamide/27% polyhexamethylene sebacamide.

The stabilizer system used in the present invention for preventing thermal degradation also includes a costabilizer comprising a cyclic amidine having the following structural formula:

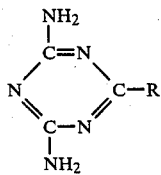

wherein R is phenyl, polynuclear aromatic, heterocylic, cycloaliphatic and aliphatic containing at least 6 carbon atoms, as well as substituted derivatives of the listed substituents.

The preferred stabilizer is benzoguanamine where in the above formula R is a phenyl group. It is theorized that the bulky phenyl substituent bonded to the ring carbon atom reduces the tendency of the benzoguanamine costabilizer to exude to the surface of the molded article and, consequently, the addition of the costabilizers of the present invention do not increase mold deposit contrary to what has been found with the addition of similar cyclic amidine compounds such as melamine.

Importantly, under conditions of normal acidity, the addition of minor amounts of benzoguanamine as a costabilizer to the superpolyamide-stabilized oxymethylene polymer does not increase the extractable formaldehyde level or mold deposit level as is the case with employing melamine as a costabilizer with superpolyamide. Under more acidic conditions, such as obtained upon the addition of an acidic pigment to the oxymethylene polymer formulation, it has been found that the addition of a melamine costabilizer actually reduces the formaldehyde level, although mold deposit problems are still likely to persist. Even with acidic formulations, the addition of the costabilizer of the present invention such as benzoguanamine results in only a minimal increase in formaldehyde levels relative to the level found employing a superpolyamide as sole stabilizer. The low formaldehyde level found using melamine is believed to be due to the fact that melamine is a stronger base than benzoguanamine and acts as an acid scavenger allowing the superpolyamide to function primarily as a formaldehyde acceptor.

The oxymethylene polymer compositions of the present invention employing as a stabilizing system a relatively major amount of a superpolyamide and a minor amount of a cyclic amidine containing a bulky substituent off of a ring carbon atom provide an improvement in the thermal stability over superpolyamide only stabilized compositions, and do not tend to produce mold deposits. The present compositions also exhibit extractable formaldehyde levels typical of oxymethylene polymers stabilized with superpolyamides and show a substantial reduction in the Mx B color value, a measure of the tendency of the oxymethylene polymer to discolor under thermal stress, as compared to compositions containing a superpolyamide as the sole thermal stabilizer.

The preferred stabilizing system useful in the compositions of the present invention can be characterized as a superpolyamide-based stabilizer system and is an attempt to improve the properties of oxymethylene polymers containing superpolyamide stabilizers. However, it is to be understood that the combination of stabilizers used in the present invention is meant to cover all practical amounts of the individual stabilizers although it is preferred that the amount of the cyclic amidine remain small in proportion to the superpolyamide to maintain the stabilizing system, in fact, one based on the superpolyamide. Thus, the preferred stabilizer employed in the present invention will contain in relative terms, a major amount of a superpolyamide stabilizer and a minor amount of the cyclic amidine stabilizer, such as benzoguanamine. The superpolyamide stabilizer is present in the composition in an amount from about 0.05 to about 2 wt. %, more preferably about 0.1 to about 0.5 wt. %. A particularly preferred amount of the superpolyamide stabilizer is from about 0.15 to about 0.35 wt. % based on the total weight of the composition.

The cyclic amidine compound containing the bulky substituent attached to a ring carbon atom as described will comprise a minor portion of the total stabilizing system and will be present in practical limits in an amount of from about 0.001 to about 1 wt. %, more preferably from about 0.005 to about 0.2 wt. %. A particularly preferred amount is from about 0.01 to about 0.05 wt. % based on the total weight of the composition.

The superpolyamide and the cyclic amidine stabilizers can be added into the oxymethylene polymer either together, one at a time, or premixed and subsequently blended with the oxymethylene polymer.

The stabilized oxymethylene polymer compositions of the present invention are prepared by admixing the stabilizers with the unstabilized polymer in any suitable manner, whereby a substantially homogenous composition is obtained. For example, the stabilizers may be incorporated into the oxymethylene polymer by dissolving both the polymer and the stabilizers in a common solvent and thereafter evaporating the solution to dryness. Alternatively, the stabilizers may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers followed by extrusion or melt compounding or by milling the stabilizers into the polymer as the latter is worked on a rubber mill.

The stabilized oxymethylene polymer compositions also include if desired, plasticizers, pigments, lubricants and other stabilizers, e.g., antioxidants, stabilizers against degradation by ultraviolet light, e.g., 2,2'-dihydroxy-4,4'-dimethoxy -benzophenonone; 2-hydroxy-4-methoxy-benzophenone; 2-hydroxy-4-methoxylchlorobenzophenone, nucleants, UV screens and absorbers, metal soaps, reinforcers and filler such as glass, talc, white mica and gold mica, polymeric substances such as ethylene vinyl acetate, polyurethanes, impact modifiers, and color pigments which are compatible with oxymethylene polymers, e.g., red pigments such as azo dye and cadmium sulfide-cadmium selenide reds and "Mercadium" reds, blue pigments such as phthalocyanine blues, green pigments such as chromium oxide greens, white pigments such as titanium dioxide whites, and black pigments such as carbon blacks which can be incorporated in amounts of up to about 5% by weight, based upon the total weight of the composition.

The following examples present illustrative but non-limiting embodiments of the present invention. Unless otherwise stated, the oxymethylene polymers used in the following examples are oxymethylene copolymers of trioxane and ethylene oxide which were prepared as described in Example 1 of U.S. Pat. No. 3,254,053. Catalyst residues in the polymer were deactivated with an amine as described in U.S. Pat. No. 2,989,509, and the copolymers were then subjected to either the melt hydrolysis process or the solution hydrolysis process as described in U.S. Pat. Nos. 3,318,848 and 3,174,948, to remove unstable terminal units.

The various analysis referred to in the examples were conducted as follows:

MOLD DEPOSIT was evaluated by repeated injection of 435°–440° F. molten acetal polymer into a 4 inch diameter by 1/16 inch thickness cavity. A 120° F. mold temperature was selected to study mold deposit buildup due to condensation of free formaldehyde and stabilizer exudation. In order to buildup sufficient amount of mold deposit for observation, 700 cycles were molded at the 120° F. mold temperature. All samples are dried at 180° F. for 4 hours before testing to assure uniformity of moisture content. During mold deposit testing, the disc mold cavity was inspected every 50 shots for the initial 250 shots, and subsequently every 100 shots. Mold deposit is described to be light (crescent shaped buildup around the gate), medium (annular buildup inside the disc cavity), and heavy (uniform buildup inside the disc cavity). At various times, a portion of the mold cavity was wiped with a cloth soaked with Noxon, a liquid metal polish manufactured by Boyle-Midway. The Noxon coating was allowed to stay the mold surface for three minutes before wiping. If the mold deposit could not be removed by the application of Noxon, it was recorded as intractable.

EXTRACTABLE FORMALDEHYDE: was measured by boiling 100 grams of sample in 100 ml distilled water at reflux for 60 minutes. The extract was then neutralized with potassium hydroxide (0.1N) solution and the final pH was noted. Fifty milliliters of sodium sulfite (0.1N) solution was added to the extract. This final solution was then titrated with sulfuric acid (0.1N) to the original pH level noted previously. An extractable formaldehyde value was calculated from the following formula:

% extractable formaldehyde = $(T \times N \times 3)/W$ where
T = milliliters of sulfuric acid
N = normality of sulfuric acid
W = exact sample weight in grams

HUNTER COLOR

Hunter color is a standard color measurment procedure used for testing colored and natural plastic materials. A 2" disk was molded for the measurement. This disk was inserted into a calibrated Hunter Colorimeter set in the reflectance mode. Three parameters (L, a, b,) were obtained which define the brightness and color of the disk.

HEAT AGED B COLOR

The heat aged color test was performed on a 2" disk (as above) which was placed on a rack in a laboratory oven (116° C.). Disks were withdrawn at periodic intervals and read on a Hunter colorimeter (b value). After 384 hours a final disk was withdrawn and read. This test is designed to determine the thermal color stability of the formulations.

MX COLOR: was measured by holding a few grams of acetal sample for 30 minutes at 230° C. in a melt indexer. The sample was then extruded and compression molded into a ⅛ inch thickness plaque to determine it's b color change by using a Hunter Colorimeter. The test measures the discoloration tendency of the resin experienced by the molder.

THE THERMAL DEGRADATION RATE OF THE POLYMER ($K_{D230}$): was measured by determining the percent weight loss of a sample of the polymer heated in an open vessel in a circulating air oven at 230° C. For example, the $K_{D230}$ of an unstabilized oxymethylene copolymer of trioxane and ethylene oxide, which was subjected to hydrolysis to remove unstable end groups, is well over 1 percent per minute and generally results in a complete loss after 45 minutes at 230° C.

Kd COLOR

This was the final visual color reading taken on the melted pellets after they had been subjected to the Kd procedure (230 C/45 minutes). Measurements were subjective (yellow, brown, etc.). This measurement simulates color development under extreme processing conditions.

EXAMPLE 1

Composition samples 1 through 4 were prepared by mixing the components in a tumble blender and then extruding the mixture using a 1½" Johnson extruder at 390° F. The resulting pellets were dried at 150° overnight and then molded on an 8 oz. Reed injection molding machine at 395° F., 35 second cycle time and at 9,000 psi. The oxymethylene polymer composition used was a mixture comprising 50% of MH copolymer (melt hydrolysis polymer) and 50% SH copolymer (solution hydrolysis polymer). All compositions contained a conventional hindered-phenol type antioxidant, a mold release agent and a nucleant in amounts typically employed by those skilled in the art to which the present invention pertains. The superpolyamide utilized was a commercial stabilizer comprising a terpolymer of approximately 38% polycaprolactam/35% polyhexamethylene adipamide 27% polyhexamethylene sebacamide. Benzoguanamine (BZG) was used in the compositions exemplary of the present invention. The extrudate was chopped and subjected to the following analyses: Hunter B color, Mx B color, heat aged B color, Kd thermal degradation, Kd color, extractable formaldehyde and mold deposit. These analyses were conducted as described above.

Each of the samples in Example 1 were pigmented with 0.7 wt % of titanium dioxide. The results are summarized below in Tables 1 and 2.

TABLE I

Pigmented (TiO$_2$) Formulations
Superpolyamide/BZG or Melamine

| Sample | Additive | Level % | B | Mx B | Heat Aged B 384 hrs. at 116° C. | Kd Color |
|---|---|---|---|---|---|---|
| 1 | Cyanoguanadine | 0.1 | 3.28 | 6.8 | 7.45 | White |
| 2 | Superpolyamide | 0.25 | 3.87 | 8.1 | 7.84 | Beige/Tan |
| 3 | Superpolyamide Benzoguanamine | 0.25 0.05 | 3.76 | 3.3 | 6.60 | Beige/Tan |
| 4 | Superpolyamide Melamine | 0.25 0.05 | 3.42 | 3.2 | 5.32 | White |

TABLE II

Pigmented (TiO$_2$) Formulations
Superpolyamide/BZG or Melamine

| Sample | Additive | Kd %/Min. | Extractable CH$_2$O % |
|---|---|---|---|
| 1 | Cyanoguanadine | .017 | .018 |
| 2 | Superpolyamide | .020 | .030 |
| 3 | Superpolyamide Benzoguanamine | .011 | .033 |
| 4 | Superpolyamide Melamine | .010 | .024 |

As can be seen from the data, the Mx B values were substantially reduced by the addition of either benzoguanamine or melamine to the superpolyamide stabilizer as compared to cyanoguanidine or superpolyamide used alone as a stabilizer for the oxymethylene copolymer. Similarly, addition of BZG or melamine to the pigmented samples resulted in greatly improved Kd control apparently from neutralization of the acidic pigment. The use of melamine as a costabilizer with the superpolyamide resulted in extractable formaldehyde levels less than the superpolyamide control as well as the BZG costabilizer composition. It is believed that the melamine gives better results with the pigmented formulations due to the fact that it is a stronger base than BZG.

EXAMPLE 2

Samples 1 through 8 were prepared as in Example 1 and were mixed and extruded as described in that example. All samples were natural formulations which did not contain pigment and unless otherwise indicated were mixtures of 50/50% MH/SH stabilized copolymers. Analyses of the samples are set forth in Tables III and IV.

TABLE III

Natural Formulations
Superpolyamide/BZG or Melamine

Analyticals

| Sample | Stabilizer | Level % | B | Mx B | Kd %/Min. | Ext. CH$_2$O % |
|---|---|---|---|---|---|---|
| 1 | CNG | 0.1 | 5.60 | 23.5 | .019 | .024 |
| 2 | Superpolyamide | 0.25 | 3.68 | 13.0 | .009 | .015 |
| 3 | Superpolyamide Benzoguanamine | 0.25 0.05 | 3.17 | 7.1 | .012 | .015 |
| 4 | Superpolyamide Melamine | 0.25 0.05 | 3.04 | 6.3 | .014 | .030 |
| 5 | Superpolyamide Benzoguanamine | 0.25 0.02 | 2.98 | — | .014 | .015 |
| 6 | Superpolyamide Melamine | 0.25 0.02 | 2.78 | — | .014 | .024 |
| 7 | Superpolyamide 70% MH | .25 | 3.11 | — | .015 | .018 |
| 8 | Superpolyamide 100% MH | .25 | 3.22 | — | .012 | .024 |

TABLE IV

Mold Deposit
Natural Formulations
Superpolyamide/BZG or Melamine

| | | Level | No. of Cycles | | | Mold Deposit Removal |
|---|---|---|---|---|---|---|
| | | | Light | Medium | Heavy | |
| 1. | CNG | .1 | 75 | 150 | 350 | Razor Blade[1] |
| 2. | Superpolyamide | .25 | 625 | — | — | Noxon[2] |
| 3. | Superpolyamide Benzoguanamine | .25 0.05 | 600 | — | — | Noxon[2] |
| 4. | Superpolyamide Melamine | .25 0.05 | 325 | — | — | Razor Blade[1] |

[1]It was necessary to scrape the mold with a razor blade in order to remove the mold deposit.
[2]Noxon is a liquid metal polish manufactured by Boyle-Midway.

As can be seen, the addition of BZG and melamine as costabilizers with the superpolyamide drastically reduced the Mx B color as compared with the use of a superpolyamide stabilizer as the sole thermal stabilizer. Importantly, the use of BZG as a costabilizer maintained the low levels of extractable formaldehyde as the superpolyamide comparison whereas the employment of a melamine costabilizer doubled the extractable formaldehyde levels. Further, the low mold deposit which was observed with the compositions of the present invention was comparable with the use of superpolyamide as sole thermal stabilizer. Compositions containing melamine showed increased mold deposit tendency.

What is claimed is:

1. An oxymethylene polymer composition which comprises an oxymethylene polymer having incorporated therein a stabilizer comprising a major amount of a superpolyamide and a minor amount of benzoguanamine.

2. The composition of claim 1 wherein said superpolyamide is present in an amount of from about 0.05 to about 2 wt. % and said benzoguanamine is present in amounts of from about 0.001 to about 1 wt. % based on the total weight of the composition.

3. The composition of claim 2 wherein said superpolyamide is present in amounts of from about 0.15 to about 0.35 wt. % and said benzoguanamine is present in amounts from about 0.01 to about 0.05 wt. % based on the total weight of the composition.

4. The composition of claim 1 wherein said oxymethylene polymer is selected from the group consisting of:
   (i) oxymethylene homopolymer,
   (ii) oxymethylene copolymer comprising about 60 to about 99.6 percent recurring —OCH$_2$— groups interspersed with groups of the formula:

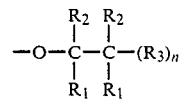

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and halo-alkyl-substituted methylene, and lower alkyl and haloalkyl-substituted oxymethylene radicals and n is an integer from 0 to 3, inclusive, each lower alkyl radical having from 1 to 2 carbon atoms, inclusive, and
   (iii) oxymethylene terpolymer, which is the reaction product of trioxane, a cyclic ether and/or cyclic acetal, and a diglycide of the formula:

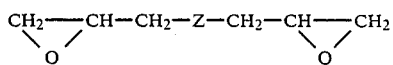

wherein Z is selected from the group consisting of a carbon-to-carbon bond, oxygen, an oxyalkoxy of 1 to 8 carbon atoms, and an oxy-poly(lower alkoxy).

5. The composition of claim 1 wherein said oxymethylene polymer is said copolymer.

6. The composition of claim 1 wherein the copolymer is a copolymer of trioxane and ethylene oxide, 1,3-dioxolane or both.

7. The composition of claim 2 wherein said superpolyamide is present in an amount of from about 0.1 to about 0.5 wt. % and said benzoguanamine is present in amounts from about 0.005 to 0.02 wt. % based on the total weight of the composition.

* * * * *